J. J. FRANK.
THRUST BEARING FOR CRANK SHAFTS.
APPLICATION FILED SEPT. 3, 1919. RENEWED FEB. 18, 1922.
1,429,499.
Patented Sept. 19, 1922.
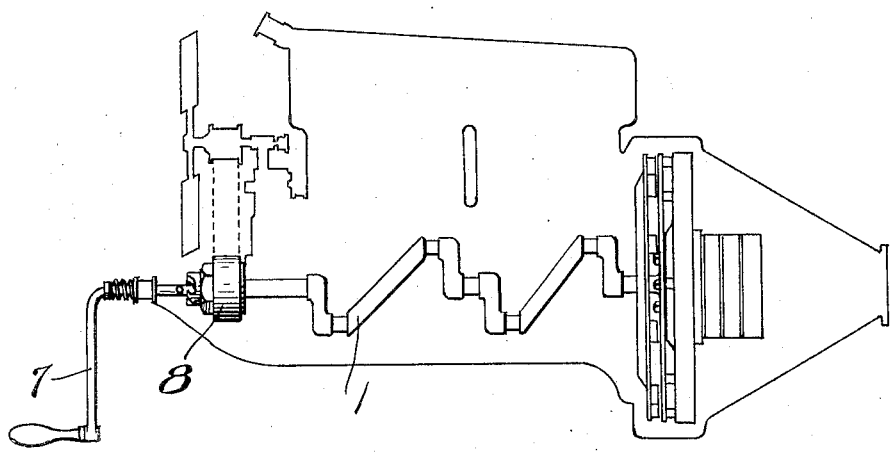
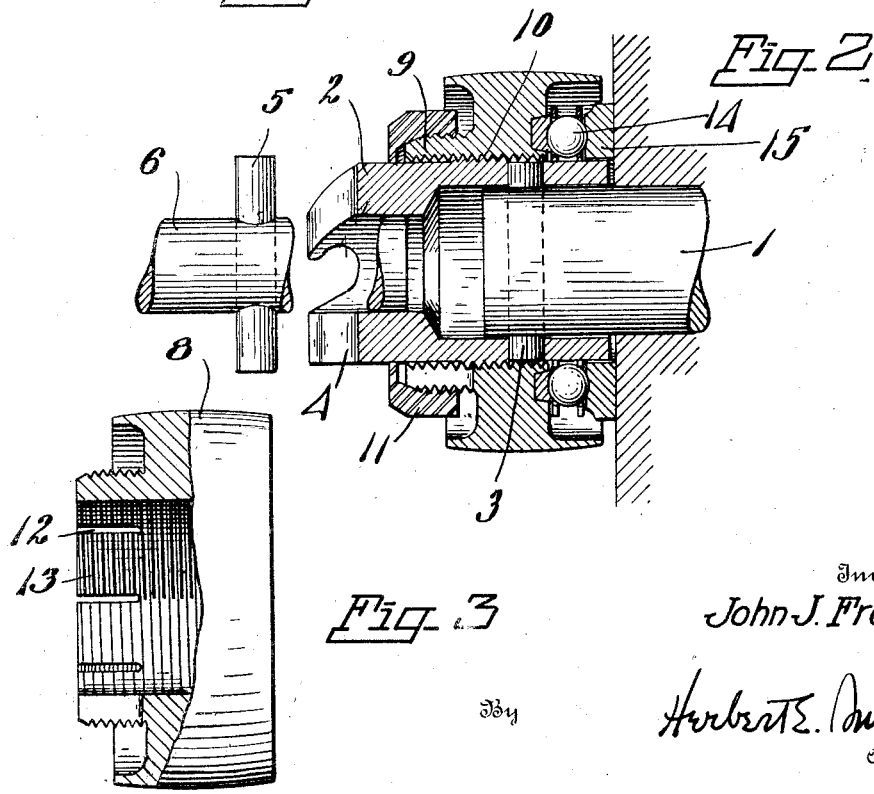
Inventor
John J. Frank
By Herbert E. Smith
Attorney Patented Sept. 19, 1922.

1,429,499

UNITED STATES PATENT OFFICE.

JOHN J. FRANK, OF SPOKANE, WASHINGTON, ASSIGNOR TO ARTHUR A. PROULX, OF ALMIRA, WASHINGTON.

THRUST BEARING FOR CRANK SHAFTS.

Application filed September 3, 1919, Serial No. 321,421. Renewed February 18, 1922. Serial No. 537,642.

*To all whom it may concern:*

Be it known that I, JOHN J. FRANK, a citizen of the United States of America, residing at Spokane, in the county of Lincoln and State of Washington, have invented certain new and useful Improvements in Thrust Bearings for Crank Shafts, of which the following is a specification.

The present invention relates to improvements in engine starters of the mechanical type, and is particularly applicable for use in connection with the Ford make of automobiles for the purpose of maintaining the crank shaft against longitudinal movement, particularly to the rear, to retain the magneto connections in proper position, and also insure proper tracking of the clutch members.

In the engine of the type of automobile above mentioned there is a tendency of the gearing to pull the fifth wheel to the rear, especially when the engine is in neutral position with the result that there is a slight movement of the crank shaft which is increased under continuous wear until the magneto is unbalanced and in consequence its brushes do not properly engage and function, thus giving a retarded spark and causing other objectionable conditions to arise.

To overcome these and other difficulties I provide a sleeve connection in connection with a thrust bearing for maintaining the crank shaft against longitudinal movement which coupling or connection co-acts with the pulley for driving the fan of the engine. The invention thus consists in certain combinations and arrangements of parts coupled to the crank shaft at the front of the engine, as will be hereinafter more particularly pointed out and claimed.

In the accompanying drawings I have illustrated one complete example of the physical embodiment of my invention, the parts being combined and arranged according to the best mode I have so far devised for the practical application of the principles of my invention.

Figure 1 is a diagrammatic view showing the engine of an automobile and other parts in connection with the crank shaft and the hand crank for starting the engine, the device forming the subject matter of the present invention being illustrated in proper position on the crank shaft.

Figure 2 is an enlarged, vertical sectional view of the coupling and bearing showing its relation to the crank shaft and starting handle.

Figure 3 is a view in elevation, partly broken away for convenience of illustration of the integral sleeve and driving pulley for the fan.

In adapting the device to the well known type of cars, the fixed member of the starting clutch is removed from the end of the crank shaft 1, and this member is replaced by a clutch bushing 2 having diametrical openings therein to accommodate the pin 3 passed therethrough and through the diametrical opening in the shaft 1 for securing the bushing on the end of the shaft, as indicated in Figure 2. The outer end of the bushing 2 is provided with jaws 4 for the reception of the fixed pin 5 in the crank 6 of the starting handle 7 of ordinary type. Through this mechanism the engine may be started in usual manner by the well known form of starting handle illustrated in Figure 1 of the drawings.

An end thrust bearing for the shaft is provided in connection with this bushing through the instrumentality of the fan driving pulley 8 that is rotatable with the crank shaft, and is fashioned with an internally threaded hub or sleeve 9 that is threaded on the external threads 10 of the pulley bushing 2. The pulley is secured in rigid position on the bushing through the instrumentality of the clamp or locking nut 11 threaded on the external threads of the hub or sleeve, and in order to clamp the sleeve on the bushing, the former is provided with longitudinal slots 12 to form resilient tongues 13 upon which the lock nut, which is tapered for the purpose, bears and forces the inner bore of the hub into contact with the outer surface of the bushing.

Thus the pulley wheel may be turned to proper position on the bushing and then locked in the adjusted location by turning the clamp or clock nut to force the resilient ends of the tongues of the hub into close frictional contact with the bushing to lock the parts in well known manner.

A series of bearing balls 14 are interposed between the pulley and the engine frame, a race ring 15 being provided around the bushing and against the frame, to take the thrust, and it will be readily apparent that the ball bearing will take the end thrust of the crank shaft. From the above description taken in connection with the drawings it is apparent that, in connection with the driving pulley for the fan belt, I have provided means for adjusting the crank shaft to its proper position, which may be accomplished by pulling or pushing the shaft longitudinally, and then locking the nut and pulley in their proper positions as described. Thus the shaft is not only adjusted to its proper place, but may be maintained therein, and the end thrust of the shaft is taken up by the interposed ball bearing between the pulley and the engine frame, with the consequent elimination of friction between parts.

What I claim is—

The combination in an engine starting device with a crank shaft, and an externally threaded, fixed, bushing having means for engagement of the starting handle, of a fan-belt driving pulley having internal threads to engage the bushing threads, said pulley having a series of longitudinal slots to form clamping tongues, an inner tapered locking nut engaging the tongues to lock the pulley on the bushing, a race ring against the fixed part of the engine frame, and ball bearings interposed between said ring and the pulley.

In testimony whereof I affix my signature.

JOHN J. FRANK.